(No Model.)

E. C. CONVERSE.
COUPLING FOR TUBING.

No. 252,020. Patented Jan. 10, 1882.

Witnesses
F. J. Hay
A. M. Imbrie

Inventor Edmund C. Converse
By Attorney James I. Kay

UNITED STATES PATENT OFFICE.

EDMUND C. CONVERSE, OF PITTSBURG, PENNSYLVANIA.

COUPLING FOR TUBING.

SPECIFICATION forming part of Letters Patent No. 252,020, dated January 10, 1882.

Application filed October 22, 1881. (No model.)

*To all whom it may concern:*

Be it known that I, EDMUND C. CONVERSE, of Pittsburg, in the county of Allegheny and State of Pennsylvania, have invented a new and useful Improvement in Couplings for Tubing; and I do hereby declare the following to be a full, clear, and exact description thereof, reference being had to the accompanying drawings, forming a part of this specification, in which—

Figure 2:
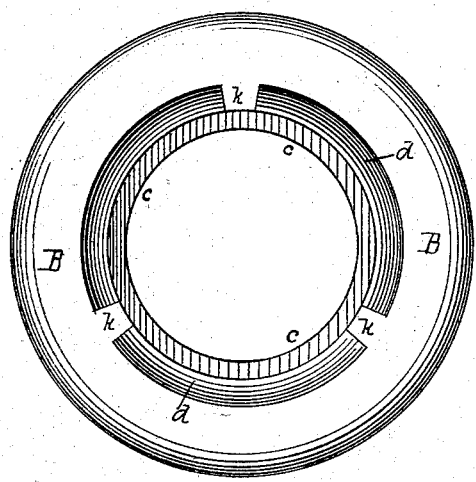
Figure 1:
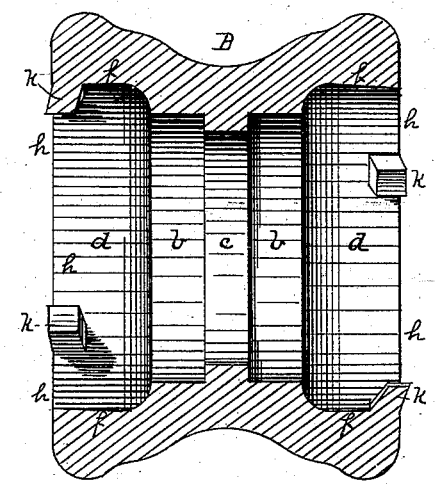
Figure 3:
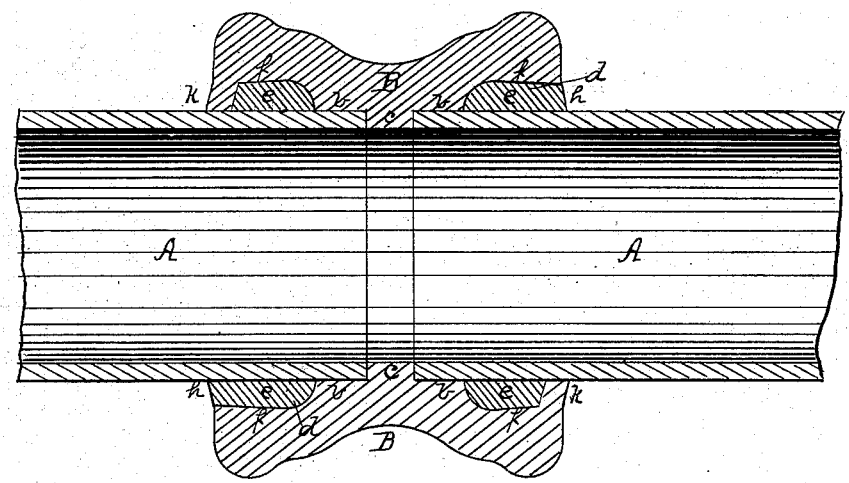

Figure 1 is a longitudinal section of my improved coupling, showing the ends of two tube-sections connected. Fig. 2 is a like view of the collar employed in coupling, and Fig. 3 is an end view of the collar.

Like letters of reference indicate like parts in each.

My invention relates to couplings for metal tubing, its object being to form a coupling whereby the several lengths of tubing can be connected without cutting into and weakening the tubing, as is the case where they are connected by screw-threaded couplings. Where a screw-thread is cut into a metal tube it is so weakened at the point threaded that to enable this point to withstand the necessary internal pressure the tube is formed of metal much thicker than necessary for the unthreaded portion of the tube. The increased thickness of the tubing necessarily adds much to its cost, and on account of its increased weight increases the cost of shipping, so that an efficient coupling for light tubing, which does not require the tubing to be cut into, is much sought after.

My invention consists in a metal collar having an inner central ring, against which the ends of the tube-sections fit, an annular recess at each end for the reception of lead or similar calking, and a series of projections or wings extending across the mouth of each annular recess for the support of the tubing during calking, or on any subsequent strain in use.

To enable others skilled in the art to make and use my invention, I will describe its construction and manner of use.

In the drawings referred to, A A are the ends of two tube-sections connected by my improved joint or coupling; and B is my improved coupling-collar, which is preferably made of cast metal, though it may be formed of wrought metal by forging and turning, if desired. The inner face, $b$, of the collar is of proper diameter to fit neatly around the exterior of the tubes to be joined, and in the center of the collar is an annular ring or projection, $c$, extending inwardly so as to form on either side of it an annular shoulder, against which the ends of the respective tubes to be connected butt or bear. This ring $c$ is of about the same thickness or height as the thickness of the tubing to be joined, so that a smooth interior is obtained for the passage of the fluid to be conducted. At either end of the collar is formed the annular recess $d$, which extends down from the end into the collar a sufficient distance for the reception of the proper amount of lead or other calking substance, as shown at $e$, by which the tube is secured in the collar. The sides or faces $f$ of the recess $d$ are preferably formed inwardly-flaring, the recess being of larger diameter at the base than at the mouth $h$, being constructed in this form to hold the calking material more securely in place and enable it to withstand without displacement any internal pressure from the fluid carried in the tubing. Around the mouth $h$ of each annular recess $d$ are a series of projections or wings, $k$, which extend inwardly across the recess, so that their faces are parallel with the inner face, $b$, of the collar, these wings resting against the tube-section, so as to center it when placed within the collar and hold it in that position while the melted lead is being poured into the recess and calked, and also serving to support the tubing and relieve the calking material from undue strain during the subsequent use of the tubing. For this purpose a series of three wings, $k$, as shown, is generally sufficient, though more may be employed if desired.

My improved tube-coupling is connected in the following manner: The ends of the tube-sections to be connected are inserted into the collar until they butt or bear against the central ring, $c$, the tubes being centered and supported by the inner faces, $b$, and series of wings $k$. The melted lead or other calking material is then poured into the annular recesses $d$ and calked therein in the usual manner when the coupling is made. If desired, one tube-section may be first inserted and secured, and the other one subsequently inserted and secured; but this consumes more time and is more laborious and expensive. The different tube-sections are thus coupled without cutting into the tubing or weakening it in any manner, as by flaring or expanding, so that tubing may be employed which is only strong enough to withstand the required internal pressure strain when unthreaded, and is consequently much thinner and lighter than the ordinary threaded tubing employed for the same purpose, thus saving in the cost of the tubing employed and also in the cost of shipment—an important item with large shipments at long distances. As the collars are only secured to the tubing when the tubing is used, they may be formed at or near the place of use, thus saving the expense of long shipments, the couplings generally in use being necessarily formed and fitted where the tubing is manufactured. As the inner surface of the tubing and coupling is smooth, the passage of the fluid is not obstructed, and it has not the opportunity to press through the coupling and leak.

What I claim as my invention, and desire to secure by Letters Patent, is—

1. In couplings for tubing, a coupling-collar having an inner central ring, against which the ends of the tubing bear, an annular recess at each end for the reception of calking material, and a series of wings extending across the mouth of each annular recess to support the tube-section, substantially as set forth.

2. In couplings for tubing, a coupling-collar, B, having a central ring, c, and an annular calking-recess, d, at each end, having inwardly-flaring sides f, substantially as and for the purposes set forth.

3. In couplings for tubing, a coupling-collar, B, provided with an annular calking-recess, d, at each end, and a series of wings, k, extending across the mouth of each annular recess, substantially as and for the purposes set forth.

In testimony whereof I, the said EDMUND C. CONVERSE, have hereunto set my hand.

EDMUND C. CONVERSE.

Witnesses:
A. CHANDON,
WM. STRACHAN.